United States Patent
Lin

(10) Patent No.: US 7,497,318 B2
(45) Date of Patent: Mar. 3, 2009

(54) CONVEYING AND STACKING DEVICE FOR CORRUGATED BOARDS

(76) Inventor: Chun-Wei Lin, 9F-3, No.94, Baozhong Rd., Xindian City, Taipei County (TW)

( * ) Notice: Subject to any disclaimer, the term of this patent is extended or adjusted under 35 U.S.C. 154(b) by 75 days.

(21) Appl. No.: 11/714,768

(22) Filed: Mar. 7, 2007

(65) Prior Publication Data

US 2008/0219829 A1    Sep. 11, 2008

(51) Int. Cl.
*B65G 47/26* (2006.01)
(52) U.S. Cl. ............... 198/418.9; 198/493; 271/270
(58) Field of Classification Search ........... 198/493, 198/418.7, 418.8, 418.9; 414/790.7, 793, 414/793.1; 271/202, 270
See application file for complete search history.

(56) References Cited

U.S. PATENT DOCUMENTS

| | | | | |
|---|---|---|---|---|
| 4,632,381 A | * | 12/1986 | Cuir et al. | 271/270 |
| 5,100,124 A | * | 3/1992 | Pouliquen | 198/418.9 |
| 5,797,598 A | * | 8/1998 | Marschke et al. | 271/202 |
| 6,182,814 B1 | * | 2/2001 | Koehler | 198/418.7 |
| 6,382,391 B1 | * | 5/2002 | Singleton et al. | 198/418.9 |
| 6,824,130 B1 | * | 11/2004 | Sardella et al. | 271/270 |

* cited by examiner

*Primary Examiner*—James R Bidwell
(74) *Attorney, Agent, or Firm*—Muncy, Geissler, Olds & Lowe, PLLC

(57) ABSTRACT

The present invention discloses a conveying and stacking device for corrugated boards, which is used in a conveyor of a corrugated board production line to stack corrugated boards by a specified number and comprises an exhaust facing the downstream of the conveyor and a sucker arranged at the upstream of the exhaust and facing the procession of the corrugated boards. The sucker and the exhaust are arranged in an elevator for elevating the corrugated boards and respectively suck air and exhaust air simultaneously.

7 Claims, 5 Drawing Sheets

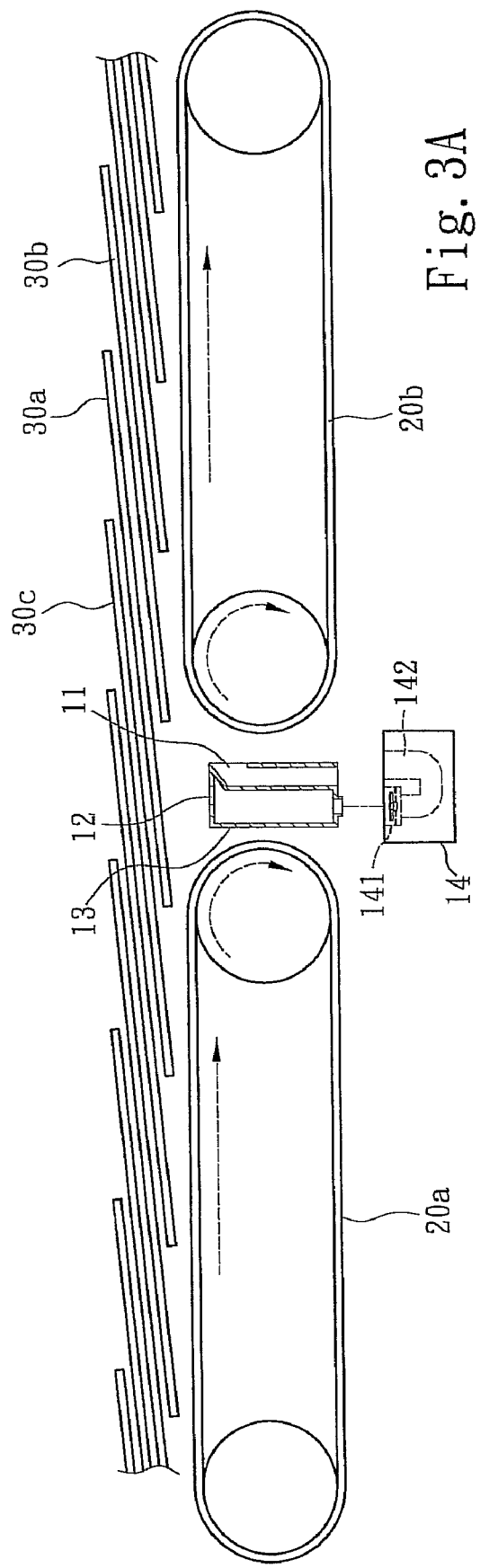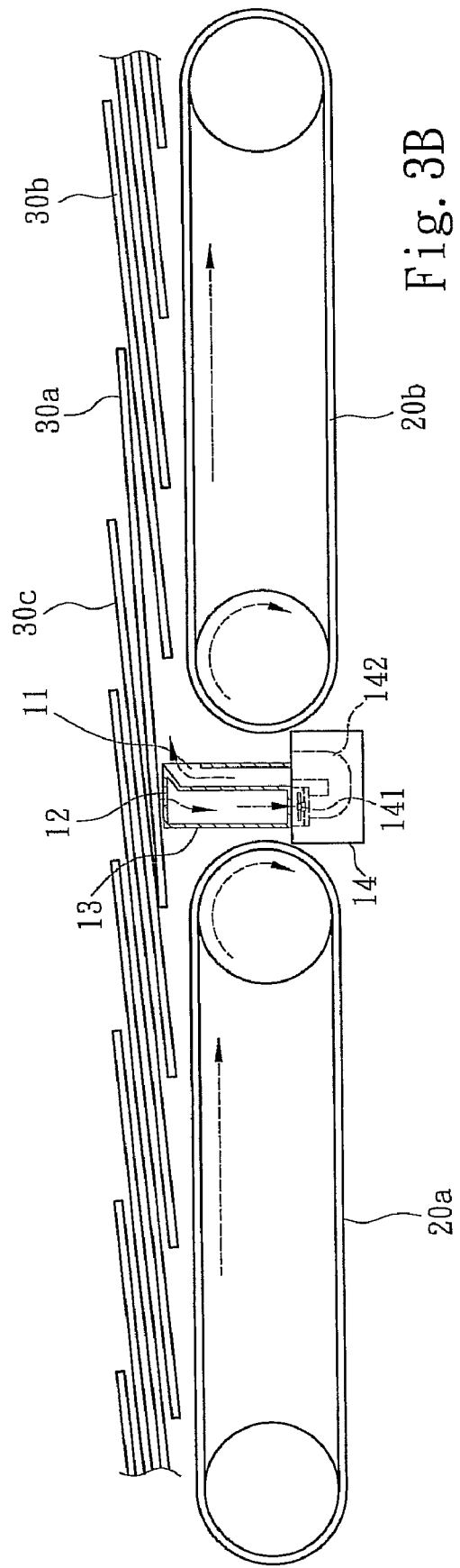

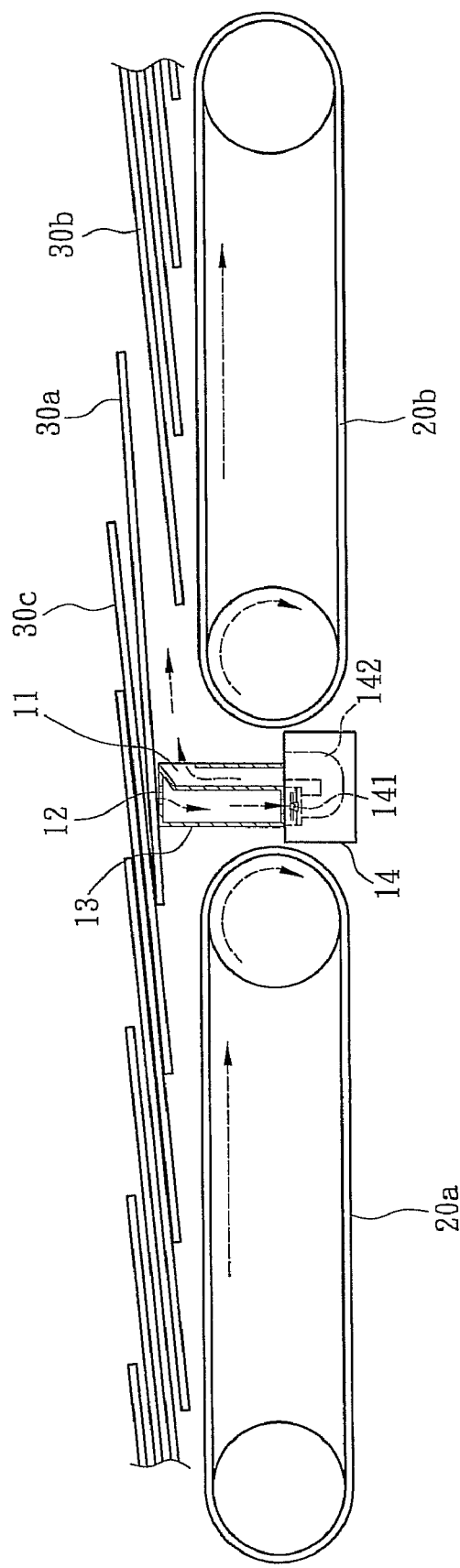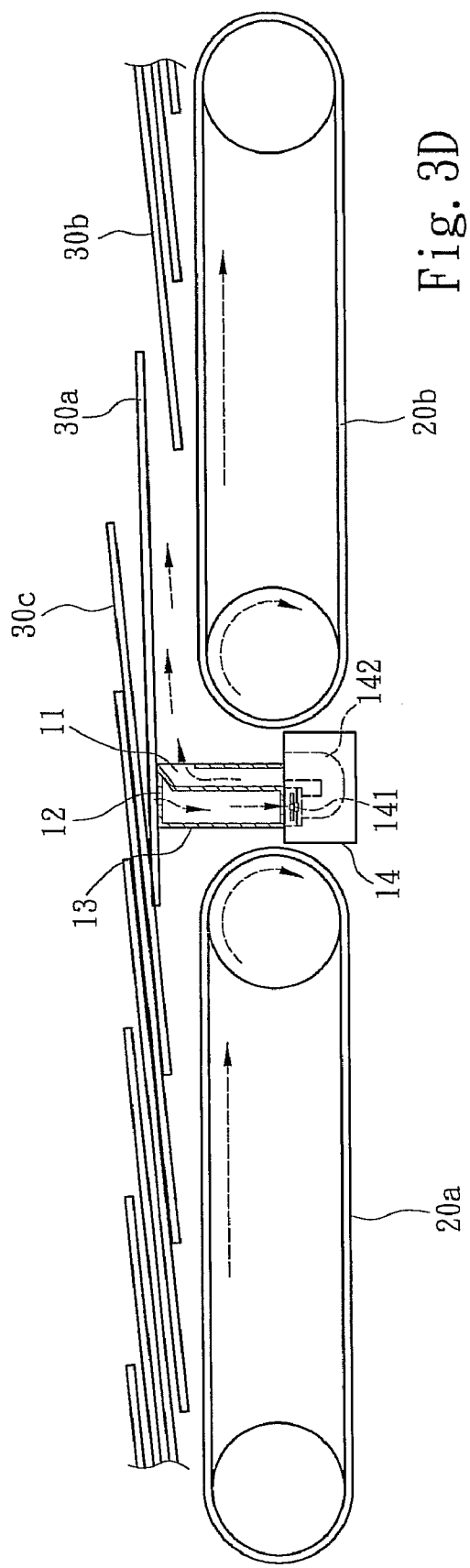

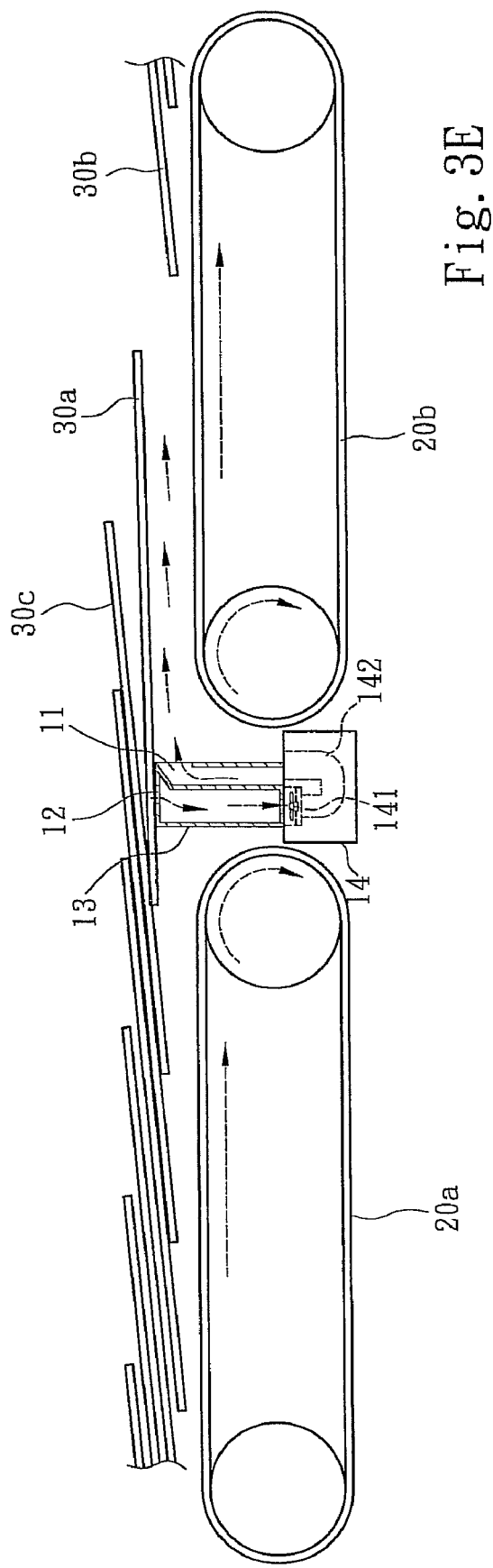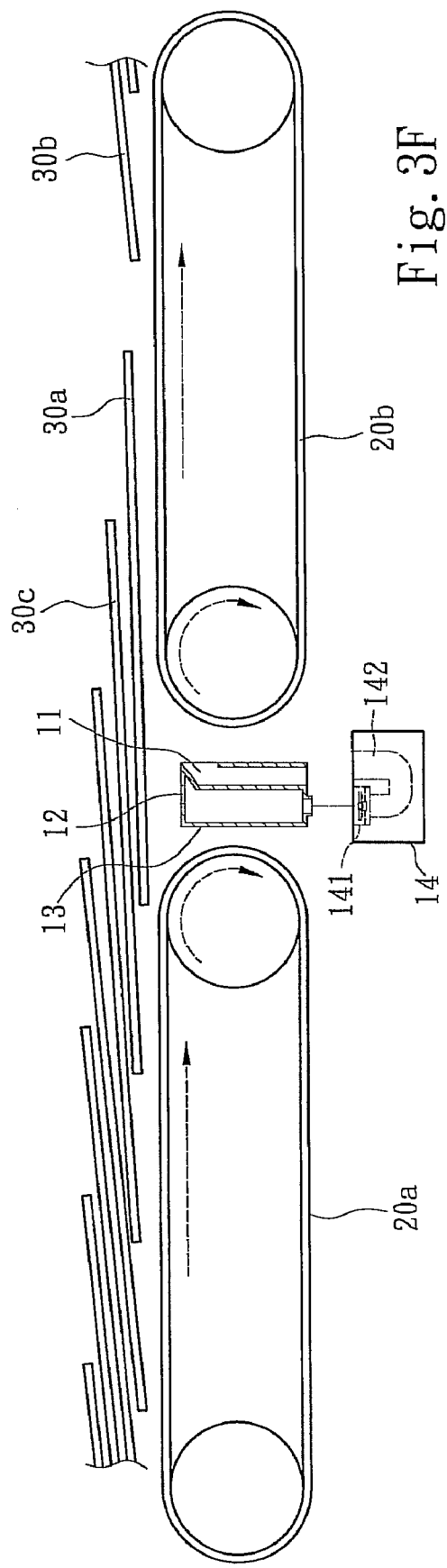

CONVEYING AND STACKING DEVICE FOR CORRUGATED BOARDS

FIELD OF THE INVENTION

The present invention relates to a conveying device for an industrial product, particularly to a conveying and stacking device for corrugated boards.

BACKGROUND OF THE INVENTION

With its weight-tolerance, damping capacity and low cost, the corrugated board is a material widely used in package and structure. The fabrication process of corrugated boards includes paper connection, pre-heating, corrugation, pasting, cooling, stitching, trimming, cutting and stacking. Then, the finished corrugated boards are transferred by a conveyor to be collected, packaged, stored and delivered or to be manufactured into corrugated boxes. The corrugated boards are transferred at a stable speed to the destination by the conveyor. To package the corrugated boards by a given number, the corrugated boards must be counted and separated manually. However, manual counting is apt to have errors and consumes more manpower. Further, if the conveyor is stopped to count the corrugated boards in detail, the finished corrugated boards will be input to the conveyor persistently, which may result in the jam or warpage of the corrugated boards or even the shutdown of the production line.

SUMMARY OF THE INVENTION

The primary objective of the present invention is to make corrugated boards be collected and packaged by a specified number in the post-fabrication conveyor. To achieve the abovementioned objective, the present invention proposes a conveying and stacking device for corrugated boards, which is arranged in a post-fabrication conveyor of corrugated boards to stack corrugated boards by a specified number and comprises an exhaust facing the downstream of the conveyor, and a sucker arranged at the upstream of the exhaust and facing the procession of the corrugated boards. The sucker and the exhaust are arranged in an elevator used to elevate one corrugated board and respectively suck air and exhaust air simultaneously. The conveying and stacking device for corrugated boards of the present invention operates in an intermittent mode. When a procession of corrugated boards passes the elevator of the conveying and stacking device for corrugated boards of the present invention, the elevator will rise to touch one corrugated board and make the corrugated board higher than the corrugated boards at the downstream thereof. The corrugated board touched by the elevator will be sucked onto the elevator by the sucker. The downstream corrugated boards will be pushed by the air pressure from the exhaust and moved by the conveyor. Thus, the downstream corrugated boards are separated from the sucked corrugated board. After a fixed length of time, the elevator is restored to the original position, and the sucker and the exhaust stop working, but the conveyor continue to move corrugated boards stably. After another fixed length of time passes, the abovementioned process repeats. Thereby, a plurality of stacks of corrugated boards is formed, which conveniences the collection and package of corrugated boards by a specified number.

BRIEF DESCRIPTION OF THE DRAWINGS

FIG. 3A to FIG. 3F are diagrams schematically showing the operation of the conveying and stacking device for corrugated boards according to the present invention.

DETAILED DESCRIPTION OF THE PREFERRED EMBODIMENTS

The technical contents of the present invention are to be described in detail in cooperation with the drawings below.

Figure 1:
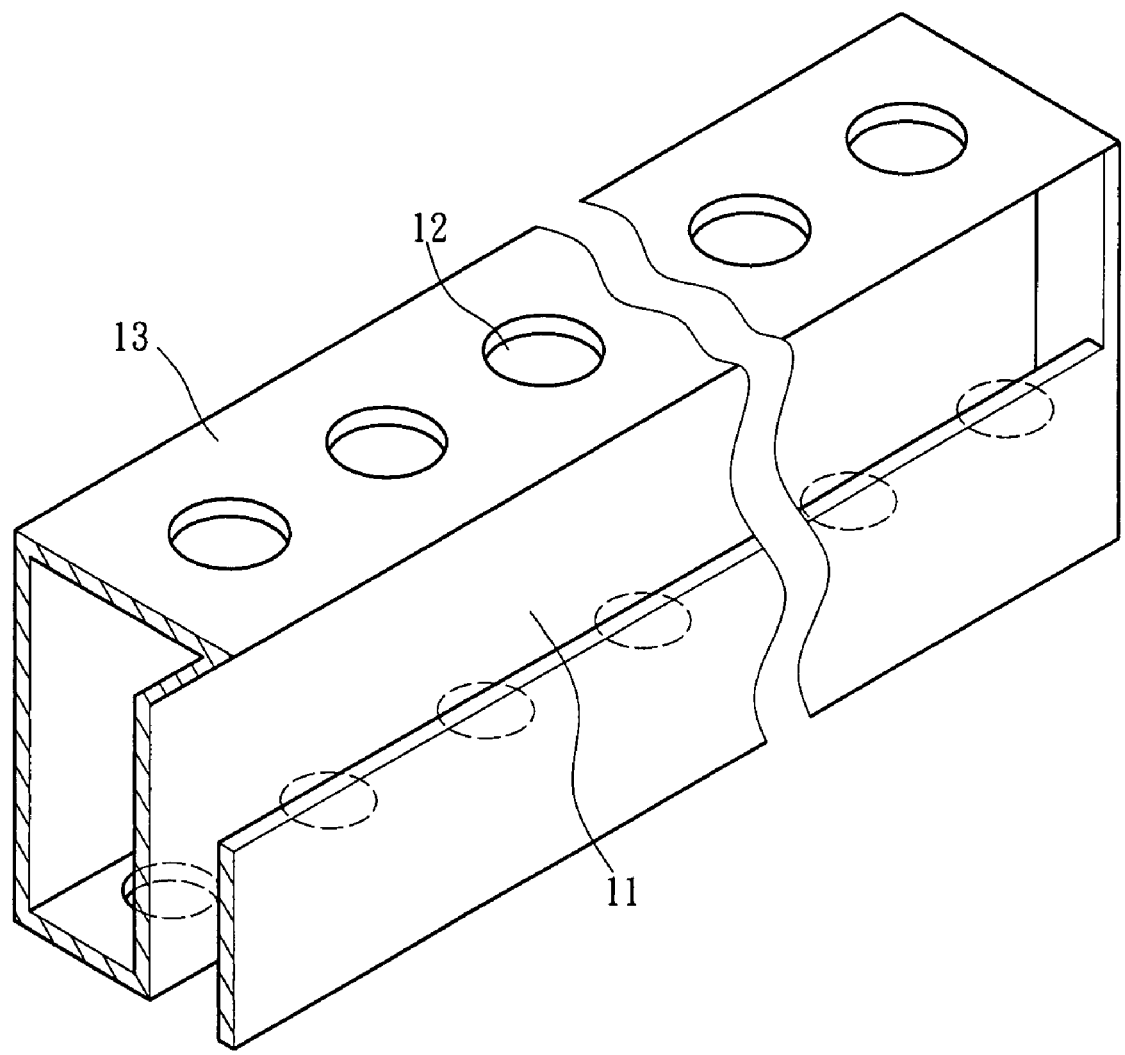
FIG. 1 is a perspective view schematically showing the conveying and stacking device for corrugated boards according to the present invention.
Figure 2A:
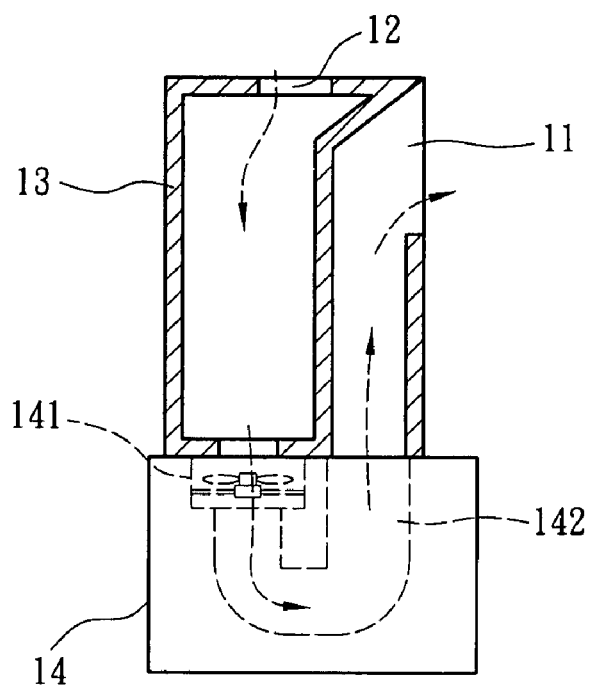
FIGS. 2A and 2B are sectional views schematically showing the conveying and stacking device for corrugated boards according to the present invention.
Figure 2B:
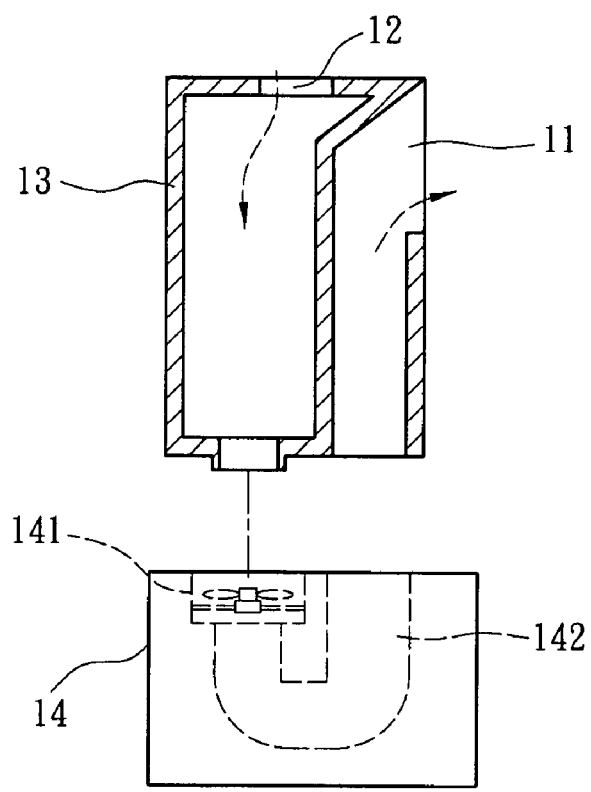

Refer to FIG. 1, FIG. 2A and FIG. 2B respectively a perspective view and sectional views schematically showing the conveying and stacking device for corrugated boards according to the present invention. The conveying and stacking device for corrugated boards of the present invention applies to a post-fabrication conveyor of corrugated boards to stack the corrugated boards by specified pieces and comprises an exhaust 11 facing the downstream of the conveyor, and a sucker 12 arranged at the upstream of the exhaust 11. The exhaust 11 and the sucker 12 are arranged in an elevator 13. The elevator 13 connects with an exhaust blower 14, which interconnects the exhaust 11 and the sucker 12. The exhaust blower 14 further comprises an electric fan 141 and a duct 142 connecting with the exhaust 11. When the electric fan 141 operates, air is sucked into the exhaust blower 14 via the sucker 12 and transferred through the duct 142 and then exhausted from the exhaust 11. Thus, when the sucker 12 sucks air, the exhaust 11 exhausts air simultaneously. The electric fan 141 and the elevator 13 are synchronically turned on/off intermittently. When the elevator 13 rises, the electric fan 141 operates simultaneously. As shown in FIG. 2B, the electric fan 141 and the elevator 13 may be arranged separately. In this case, the electric fan 141 will operate continuously. When the elevator 13 rises, the exhaust blower 14 will closely engage with the elevator 13 and perform the sucking and exhausting activity, as shown in FIG. 2A. However, when the elevator 13 descends, the exhaust blower 14 is separated from the elevator 13, and the sucking and exhausting activity stops, as shown in FIG. 2B. Thus, the intermittent sucking and exhausting mode is also achieved in this case.

Refer to from FIG. 3A to FIG. 3F diagrams schematically showing the operation of the conveying and stacking device for corrugated boards according to the present invention. As shown in FIG. 3A, a series of overlapping corrugated boards 30a is moved toward the destination at a stable speed by the conveyor. Initially, the sucker 12 and the exhaust 11 do not work, and the elevator 13 is at an initial position, wherein the top of the elevator 13 is at the same level of the moving path of the corrugated boards 30a or is slightly lower than the moving path of the corrugated boards 30a. When the conveying and stacking device for corrugated boards of the present invention begins to work, the elevator 13 rises, and the top of the elevator 13 is slightly higher than the moving path of the corrugated boards 30a without influencing the original arrangement of the corrugated boards 30a. At the same time, the sucker 12 sucks, and the exhaust 11 exhausts. The elevator 13 will touch a piece of corrugated board 30a and raise one side of the piece of corrugated board 30a and tilt the piece of corrugated board 30a; simultaneously, the sucker 11 sucks the piece of corrugated board 30a (as shown in FIG. 3B), and the exhaust 11 utilizes air pressure to push forward a piece of corrugated board 30b (as shown in FIG. 3C). Meanwhile, the conveyor keeps on operating. The upstream conveyor 20a stacks the corrugated boards 30c at the upstream of the conveying and stacking device for corrugated boards over the corrugated board 30a sucked by the sucker 12. The downstream conveyor 20b keeps on transferring the downstream corrugated boards 30b until the downstream corrugated boards 30b depart from the corrugated board 30a sucked by the sucker 12 (as shown in from FIG. 3D to FIG. 3F). Thus, the downstream corrugated boards 30b are separated from the upstream corrugated boards 30c. Then, the elevator 13 of the conveying and stacking device for corrugated boards of the present invention is restored to the original position, and the sucker 12 stops sucking, and the exhaust 11 stops exhausting. After a specified length of time or specified pieces of corrugated boards pass, the conveying and stacking device for corrugated boards of the present invention operates again to perform the stacking and separation of corrugated boards.

The conveying and stacking device for corrugated boards of the present invention utilizes the sucker 12 and the exhaust 11 to respectively suck a piece of corrugated board 30a and push forward the downstream corrugated boards 30b. At the same time, the upstream conveyor 20a and the downstream conveyor 20b keep on transferring the corrugated boards. Thus, the originally overlapping corrugated boards are separated. The sucking activity and the exhausting activity are preset to operate or stop after a specified length of time or specified pieces of corrugated boards pass. Via repeating the abovementioned process, the corrugated boards 30a can be separated into stacks of specified pieces of corrugated boards 30a. The conveying and stacking device for corrugated boards of the present invention has a simple structure and can effectively stack the corrugated boards 30a by a specified number to benefit the post-fabrication collection and package.

Those described above are the preferred embodiments to exemplify the present invention. However, it is not intended to limit the scope of the present invention. Any equivalent modification or variation according to the spirit of the present invention is to be also included within the scope of the present invention.

What is claimed is:

1. A conveying and stacking device for corrugated boards, used in a post-fabrication conveyor of corrugated boards to stack said corrugated boards by a specified number, and comprising the following components:
    an exhaust facing the downstream of said conveyor, and
    a sucker arranged at the upstream of said exhaust and facing the procession of said corrugated boards wherein said sucker and said exhaust respectively suck air and exhaust air simultaneously.

2. The conveying and stacking device for corrugated boards according to claim 1, wherein said sucker is arranged in an elevator used to elevate said corrugated boards.

3. The conveying and stacking device for corrugated boards according to claim 2, wherein said elevator connects with an exhaust blower, and said exhaust blower interconnects said sucker and said exhaust.

4. The conveying and stacking device for corrugated boards according to claim 3, wherein said exhaust blower is detachably coupled to said elevator.

5. The conveying and stacking device for corrugated boards according to claim 1, wherein said exhaust is arranged in an elevator used to elevate said corrugated boards.

6. The conveying and stacking device for corrugated boards according to claim 5, wherein said elevator connects with an exhaust blower, and said exhaust blower interconnects said sucker and said exhaust.

7. The conveying and stacking device for corrugated boards according to claim 6, wherein said exhaust blower is detachably coupled to said elevator.

* * * * *